United States Patent

[11] 3,556,476

[72] Inventor Norman H. Haenky
 Tulsa, Okla.
[21] Appl. No. 744,193
[22] Filed July 11, 1968
[45] Patented Jan. 19, 1971
[73] Assignee FWI, Inc.
 Tulsa, Okla.
 a corporation of Delaware

[54] BUTTERFLY VALVE HAVING IMPROVED POSITIVE CLOSURE MEANS
 12 Claims, 11 Drawing Figs.
[52] U.S. Cl. .................................................. 251/306, 251/171
[51] Int. Cl. .................................................. F16k 1/22, F16k 5/14
[50] Field of Search .......................................... 251/160—163, 305—308, 171

[56] References Cited
 UNITED STATES PATENTS

| | | | |
|---|---|---|---|
| 596,000 | 12/1897 | Heston | 251/160 |
| 2,919,885 | 1/1960 | Daigle | 251/163X |
| 3,033,513 | 5/1962 | Vulliez | 251/163 |

Primary Examiner—Henry T. Klinksiek
Attorney—Head and Johnson

ABSTRACT: This invention relates to a butterfly valve. More particularly, the invention relates to a butterfly valve having a body with a flow passage therethrough and a disc member supported in the flow passage rotatable between an opened and closed position, the disc member including means engaging portions of the body as the disc member is rotated into closed position, the cam means forcing the disc member into positive sealing engagement with a body seat.

INVENTOR.
NORMAN H. HAENKY
BY
Head & Johnson
ATTORNEYS

INVENTOR.
NORMAN H. HAENKY
BY
*Head & Johnson*
ATTORNEYS

INVENTOR.
NORMAN H. HAENKY
BY
*Head & Johnson*
ATTORNEYS 3,556,476

BUTTERFLY VALVE HAVING IMPROVED POSITIVE CLOSURE MEANS

CROSS-REFERENCE

This application is not related to any pending United States or foreign application.

BACKGROUND AND SUMMARY

Butterfly valves are widely and well known in industry. Butterfly valves are popular due to several factors, including the fact that they are relatively inexpensive compared to other types of valves, are simpler to install and maintain, and have a relatively linear flow characteristic as the valve is moved from the open to the closed position and vice-versa. One problem which has universally existed which has to a great extent limited the range of applications of butterfly valves is that they have been typically limited in this application to low pressure systems. Butterfly valves of the type presently available on the market universally function on the basis of the engagement of a rotated disc member with a body seat member, the degree of sealing force existing between the disc member and the seat member when the disc member is in closed position depending upon the accuracy of manufacturing tolerances.

This invention provides a butterfly valve which includes the arrangement of a means of positively forcing the valve disc into engagement with the seat when the valve is rotated to closed position.

It is therefore a primary object of this invention to provide an improved butterfly valve. A more particular object of this invention is to provide a butterfly valve characterized by means of positively forcing the valve disc into sealing engagement with a seat as the valve disc is rotated into closed position.

A still more particular subject of the invention is the provision of an improved butterfly valve including a cam arrangement for positively forcing the valve disc into sealing engagement with the valve seat as the disc is rotated into closed position.

Another particular object of the invention is the provision of a butterfly valve including a body having an axial fluid passageway therethrough and a disc pivotally supported in the passageway, the body being provided with a seat, the valve including means wherein the disc is positively moved into sealing engagement with the seat as the disc is moved into closed position, such positive engagement of the disc with the seat being accomplished by a cam arrangement.

Another object of the invention is the provision of improved seat means in a butterfly valve, and particularly the provision of resilient seat means in a butterfly valve including an arrangement to prevent the resilient seat from being dislodged by entrapped fluid or gas pressures.

Another object of this invention is the provision of a butterfly valve including a seat arrangement wherein the force of the closure of the disc member against the seat may be adjusted to compensate for manufacturing tolerances or wear.

These and many more objects of the invention will become apparent from the following description and claims.

DESCRIPTION OF VIEWS

DETAILED DESCRIPTION

Figure 1:
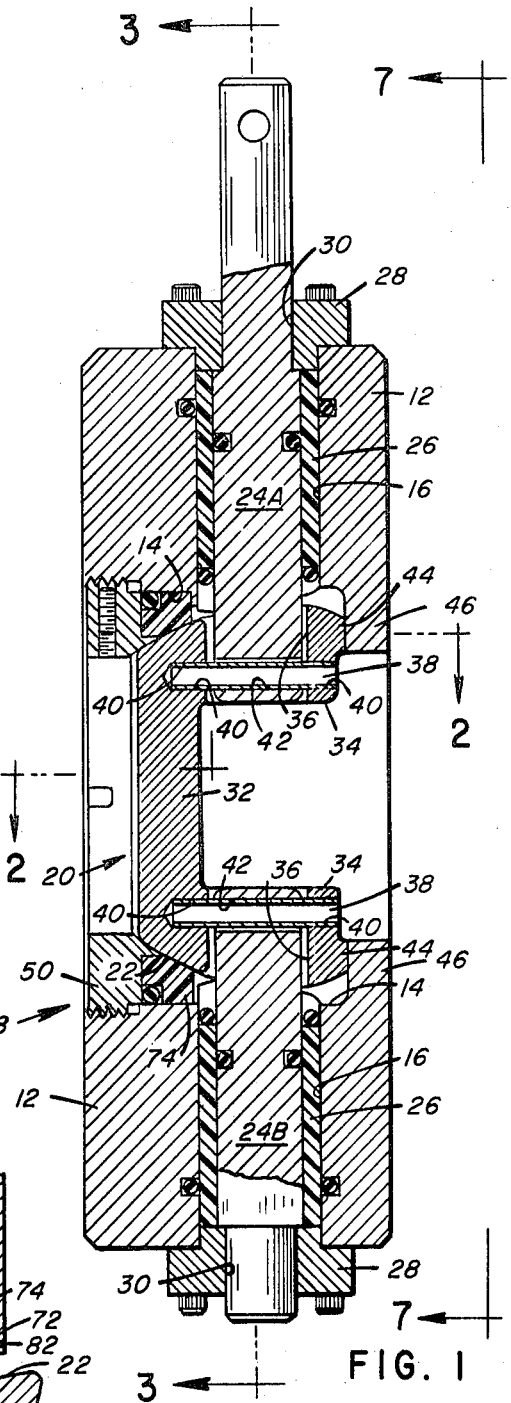
FIG. 1 is a cross-sectional view of a butterfly valve of this invention.

Referring first to FIG. 1 an exemplified embodiment of the invention is shown. The valve includes a body 12 which is generally the form of a flat disc adaptable to be inserted between flanges in a pipeline or the like. The body 12 includes an axial flow passageway 14 therethrough and includes a smaller diameter stem opening 16 intersecting the flow passageway 14 perpendicular to the axis thereof. The body 12 may be further described as including a reduced diameter seat portion generally indicated by the numeral 18. In the illustrated embodiments the seat portion 18 is disclosed as being comprised of removable elements although the seat could be formed integrally as a portion of the body. The removable elements making up seat portion 18 will be described in detail subsequently.

Rotatably supported in the flow passageway 14 is a disc member generally indicated by the numeral 20. The disc member is defined in part by a circumferential seating surface 22. Disc member 20 is rotatable between a closed position in which the seating surface 22 engages the body seat 18 and in opened position wherein the plane of the seat portion 18 is parallel the axis of the flow passageway 14 permitting free fluid flow through the passageway 14 to either side of the disc.

The disc member 20 is pivotally supported in the flow passageway 14 by means of a stem member 24, which in the illustrated arrangement, is formed of two portions, that is, in upper stem portion 24A and a lower stem portion 24B. The stem could be formed of a unitary device supporting the disc but the arrangement illustrated is preferred since the utilization of a single stem member extending fully through the valve flow passageway 14 would substantially interfere with the flow of fluid therethrough. Stem portions 24A and 24B are coaxial with each other and are sealably and rotatably supported in the stem openings 16 in the valve body. A nonmetallic friction reducing sleeve 26 is shown surrounding each of the stem portions 24A and 24B which may be utilized to reduce the torque required for the rotation of the stem, however, such sleeve portions are not directly related to the essence of this invention. Stem portions 24A and 24B could equally as well be directly rotatably received by stem opening 16.

Gaskets, in the form of strings provided in both the stem portions 24A and 24B and in the body surrounding the stem openings 16, serve to prevent leakage of fluid from the flow passageway 14 to the exterior of the valve. Sleeve follower elements 28, each with an opening 30 therein, retain the sleeve members 26 in the valve and serve to hold the stem portion 24A and 24B in improved alignment.

The stem portion 24A extends externally of the valve body 12 and provides means at the outer extending end to receive a handle or the like whereby the disc member 20 may be rotated.

The disc member 20 may be defined as including a substantially flat circular portion 32 having the circumferential seating surface 22 thereon, and integral stem boss portions 34 extending perpendicularly from the flat portion 20 in a direction opposite the seating surface 22. The integral stem boss portions 34 are parallel to and spaced from each other diametrical of the flat circular portion 32. Each of the stem boss portions 34 has an aligned stem receiving opening 36 therein.

In the preferred embodiment of this invention the openings 36 in the stem boss portions 34 are of a diameter slightly larger than the diameter of the stem portions 24A and 24B. This is to permit a degree of lateral displacement of the disc ember 20 as it is moved into seating position. To rotatably secure the disc member 22 to stem portions 24A and 24B, a pin 38 extends through pin opening 40 in each of the stem boss portions 34. Each of the stem portions 24A and 24B is likewise provided with a pin opening 42 therein to receive a pin 38. In order to permit a degree of lateral movement of the disc member relative to the stem portion 24A and 24B the pin opening 42 in each of the stem members is slightly larger than the external diameter of the pin, whereas the pin openings 40 in the disc member snugly receive pins 38 to prevent the pins from becoming dislodged. It can be seen that the opposite arrangement would function equally satisfactorily, that is, the pin opening 42 in each of the stem portions 24A and 24B may snugly receive pins 38 where the pin openings 40 in the disc member may be of slightly enlarged diameter. Other arrangements may be devised to rotatably locking the disc member 20 to at least one of the stem portions 24A or 24B wherein a limited degree of lateral movement of the disc member is retained.

An important feature of this invention is a provision of means whereby as the disc member 20 is moved in the closed position it is forced into positive sealing engagement with the seat portion 18 of the valve body. This is accomplished by an integral cam boss portion 44, best seen in FIG. 2, which is formed on the rearward surface of each of the disc member stem boss portions 34 opposite the circumferential sealing seating surface 22. The cam boss portions 44 are diametrical of each other and each is in a plane perpendicular to the axis of the stem portion 24A and 24B. Each of the cam boss portions 44 is defined in planes perpendicular to said stem portions by a curvilinear outer surface of increasing radius from the axis of the stem portions.

Extending partially into the flow passageway 14 are body boss portions 46 against which cam portions 44 engage as the disc member is rotated into closed position.

Figure 2:
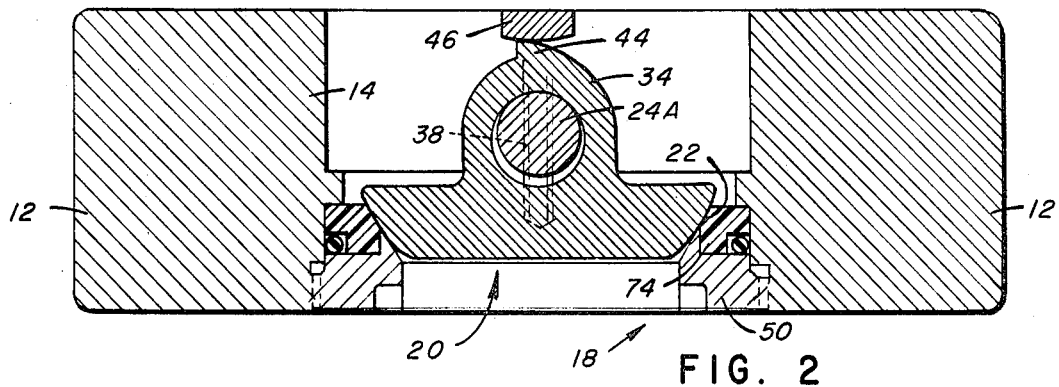
FIG. 2 is a cross-sectional view taken along the line 2-2 of FIG. 1, particularly showing the cam means of providing positive sealing pressure of the disc member against the valve seat when the disc member is in closed position.
Figure 3:
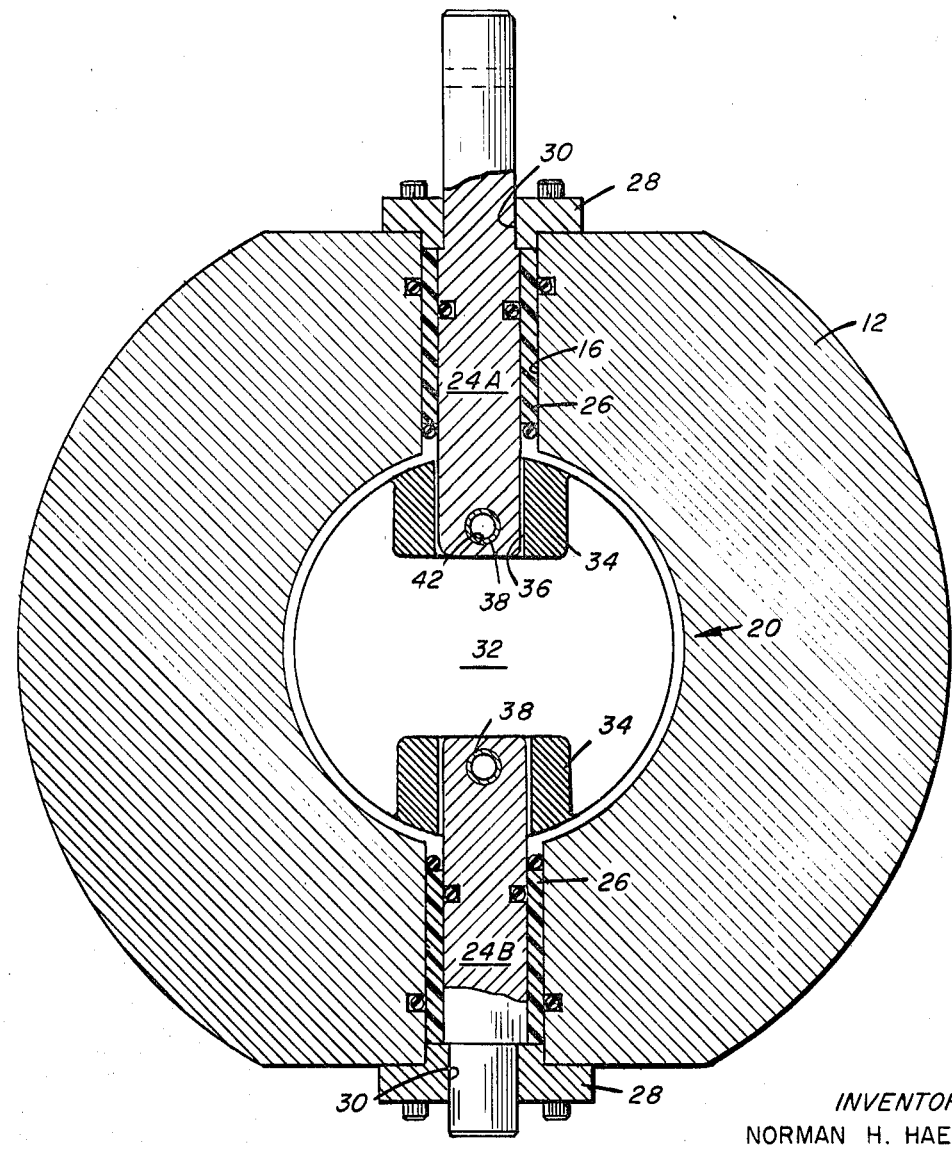
FIG. 3 is a cross-sectional view taken along the line 3-3 of FIG. 1 and showing more details of construction of the valve of this invention.
Figure 7:
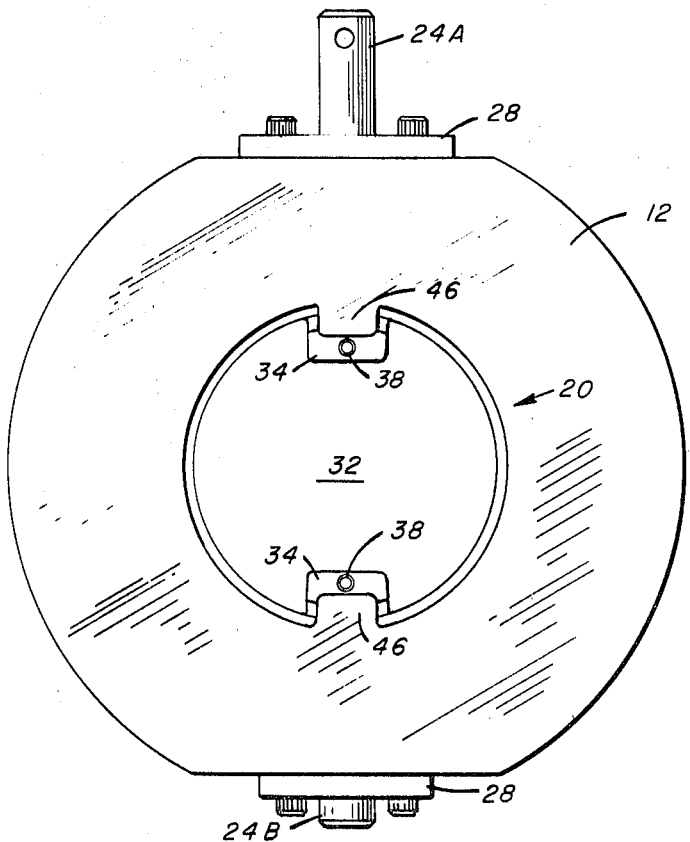
FIG. 7 is a plan view taken along the lines 7-7 of FIG. 1 of the valve of this invention.

FIG. 2 shows the relationship of the cam portion 44 of the disc in engagement with the body boss portion 46 as the disc member is in closed position. It can be seen that the force of the cam portion 44 against the body portion 46 urges the disc member 20 forwardly into the seat 18 thereby insuring positive sealing of the disc to the seat. When it is desired to open the valve the rotation thereof towards the opened position relieves the force exerted by cam portion 24 as soon as the disc member has been rotated a few degrees and thereby relieves the pressure of the disc member rubbing against the seat portion as the disc member is rotated. By this arrangement means is provided for a positive sealing of the disc against the seat portion when the disc is in the closed position but wherein the attrition of the disc against the seat as the disc is rotated between the opened and closed position is greatly reduced.

Another important aspect of the invention is the provision of means of obtaining positive sealing pressure in an arrangement wherein the disc 20 is free to move in limited amounts relative to the stem portions 24A and 24B. Since the pressure of the disc member 20 against the seat portion 18 of the valve is obtained by the action of cam portions 44, rather than lateral force applied by the stem members 24A and 24B, the disc, when in closed position, does not place any lateral force upon the stems. In other types of butterfly valves wherein all of the force tending to close the disc member against the seat member to achieve the sealing is transmitted directly to the stem members, warping of the stem members frequently occurs. In addition, the force in other types of butterfly valves tending to push the stem towards one side of the stem opening affords increased opportunity for leakage of fluid along the valve stem. In the arrangement of this invention the valve stems are under no lateral force when the disc is in closed position and therefore distortion of the valve stems and possibility of fluid leakage along the valve stems is greatly diminished.

Figure 5:
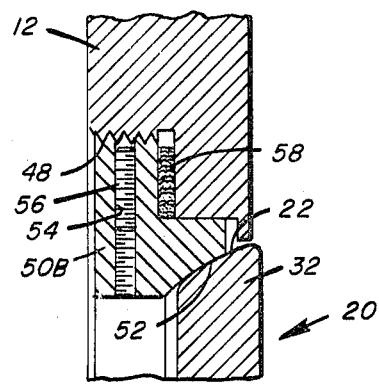
FIG. 5 is a fragmentary view of a portion of the valve of this invention showing an additional alternate embodiment of the seat arrangement.

An additional important feature of this invention is the provision of improved seat arrangements. The seat arrangement of FIG. 1 is shown in somewhat enlarged detail in FIGS. 6 and 6A. In this seat arrangement body 12 is provided with an internally threaded portion 48 which may be of enlarged internal diameter. A removable annular seat ring 50C having external threads on the circumference thereof is threadably received by the body threaded portion 48. The annular seat ring 50C is further defined by an annular seating surface 52. In the preferred arrangement as best shown in FIG. 5, the seat ring seating surface 52A is of concave cross-sectional configuration and the seating surface 22 of disc member 20 is of mating convex cross-sectional configuration. Such relationship increases the length of sealing engagement between the disc portion 20 and the seating surface 52A when the disc is in the closed position and in addition, permits a smoother transition of the disc member from open to closed position and vice versa.

In order to prevent the unthreading of seat ring 50B from its proper position within the body 12 at least one small threaded opening 54 is provided therein (see FIG. 5) intersecting the seat ring external threaded peripheral surface. A set screw 56 in the threaded opening 54 engages the body threads 48 and prevents the annular seat ring 50B from coming unthreaded. In order to prevent the possibility of leakage of fluid between the seat ring 50B and the body 12 gasket 58 may be provided.

The provision of the threaded annular seat ring 50B is important. As previously mentioned, many butterfly valves depend for sealing engagement between the body and the disc upon accurately machined tolerances. In this invention any inaccuracy in the manufacturing of the components of the valve may be compensated for by the threaded adjustment of the annular seat ring 50B as it is assembled in the valve body. In addition, as wear occurs in the valve parts, such as wear on the seating surfaces 22 and 52A, or the cam portions 44, which wear would normally reduce the closure force between the disc and the seat, such wear can be compensated by threadably adjusting the annular seating ring inwardly towards the disc.

Figure 4:
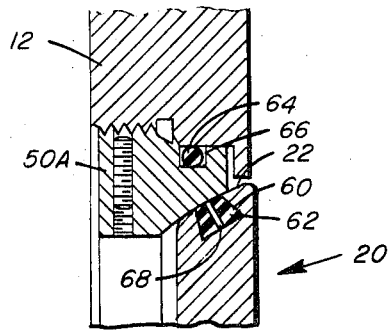
FIG. 4 is a fragmentary view of a portion of the valve of this invention showing an alternate seat arrangement.

The arrangement of FIG. 5 provides a metal-to-metal seat. FIG. 4 shows an alternate arrangement providing for a metal-to-metal seal plus the advantages of a resilient seal. In the arrangement of FIG. 4 an annular groove 60 is provided in the circumferential seating surface 22 of the disc portion 20. As illustrated, the groove 60 is preferably of dovetailed configuration, being wider at the bottom and narrower at the seating surface 22. Positioned in the groove 60 is a resilient seal 62 which normally, when the disc member 20 is not in the closed position, extends slightly above the seating surface 22. The material of which the resilient seal 62 is constructed may vary considerably according to the application of the invention, Teflon being a typical example.

In the arrangement of FIG. 4 an O-ring gasket 64 positioned in a circumferential groove 66 formed in the annular seat ring 50A prevents possible leakage of fluid between the valve body 12 and the seat ring.

Provided in the seal 62 of FIG. 4 is a plurality of spaced small diameter openings 68 which extend through the full width of the seal. The function of openings 68 is to permit relief of pressure, either fluid or gas, which may accumulate behind the seal 62. It is not infrequent in valves of known designs, particularly where subjected to high pressures, for seals to be completely dislodged due to sudden reduction of pressure to which the valve is subjected. By the provision of openings 68 pressure which may tend to occur in groove 60 behind the seal member 62 is readily relieved and thereby the expulsion of the seal from within the groove prevented.

Figures 6, 6A:
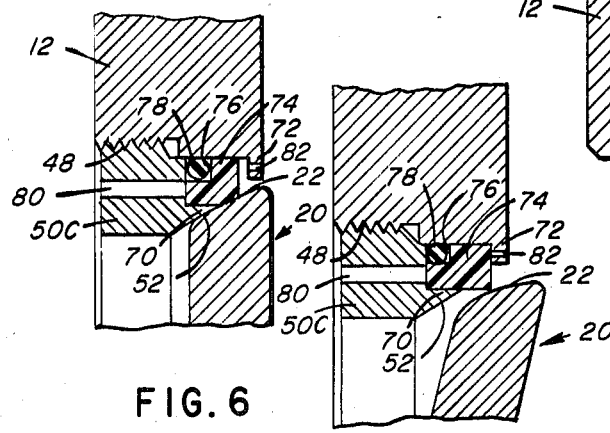
FIG. 6 is a fragmentary view of a portion of the valve of this invention showing more details of improved resilient seat means as disclosed in FIG. 1.
FIG. 6A is a fragmentary view is shown in FIG. 6 but showing the relationship of components when the disc member is moved slightly from the closed toward the opened position.

FIGS. 6 and 6A show another arrangement for an improved seat. In the arrangement depicted in these views the seat ring 50C is further defined in cross section by a reduced external diameter lip portion 70 which extends in a direction towards the disc member 20. In addition, the body fluid passageway is further defined by an annular reduced internal diameter body lip portion 72. Positioned between the seat ring lip potion 70 and the body lip portion 72 is in annular resilient sealing element 74. The sealing element 74 may be of substantially rectangular cross-sectional configuration and is normally formed of some resilient plastic, such as Teflon.

In the illustrated arrangement of FIGS. 1, 6 and 6A, the sealing element 74 has a circumferential notch 76 in the outer rearward portion thereof which receives an O-ring 78 to prevent the possibility of leakage of fluid around the sealing element.

As shown in FIG. 6, in the enclosed position of disc member 20 the circumferential sealing surface 22 engages simultaneously the seating ring seating surface 52A and the resilient sealing element 74 to provide both a metal-to-metal and a metal-to-resilient seal effect.

Provided in the annular seat ring 50C is a plurality of spaced apart small diameter pressure energized openings 80. The axis of each of the openings 80 is substantially parallel the axis of the fluid passageway 14 of the valve body. Each of the energizing openings 80 communicates with the surface of the sealing element 74 intermediate the seal ring lip portion 70 and the body flow passageway 14. By provision of energizing openings 80 the pressure of fluid tending to produce leakage past the disc member 20 is applied to the rearward surface of resilient seal 74 to increase the sealing pressure against disc member seat surface 20 and thereby increase the effectiveness of the valve.

In order to prevent entrapment of fluid pressure between the sealing element 74 and the body lip portion 72, a plurality of small diameter openings 82, equally spaced apart from each other, are provided in the lip portion.

Figure 8:
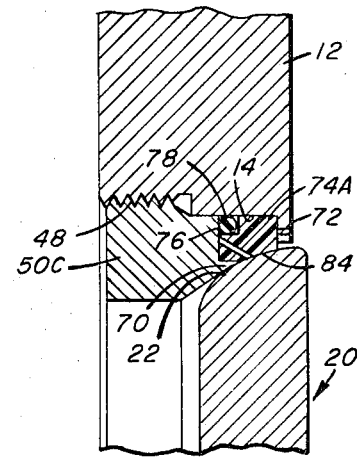
FIG. 8 is a fragmentary view showing one embodiment of the seat portion of this invention, and particularly showing means of relieving pressure behind the resilient portion of the seat.
Figure 9:
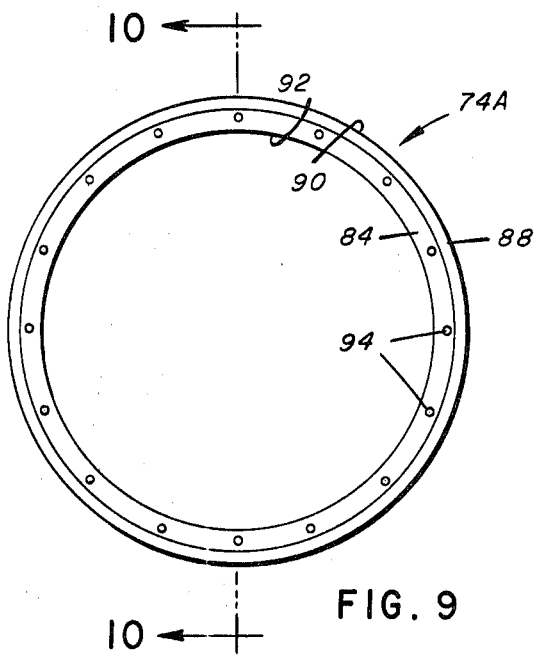
FIG. 9 is a plan view of a resilient element as utilized in the seating arrangement of FIG. 8.
Figure 10:
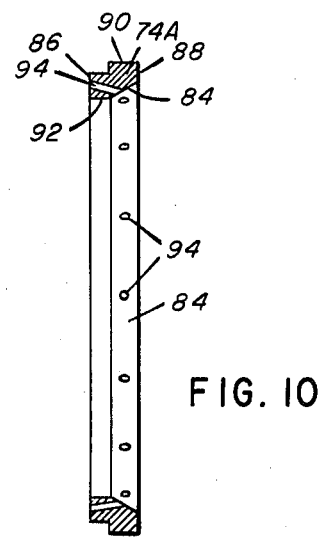
FIG. 10 is a cross-sectional view of the resilient seat portion is taken along the line 10-10 of FIG. 9.

Referring to FIGS. 8, 9 and 10 an additional embodiment of the improved seal according to this invention is shown. In this arrangement the annular resilient sealing element 74A is different from that previously described with reference to FIGS. 6 and 6A in two respects. First, the sealing element is defined in part by a substantial frustoconical annular sealing surface 84. This frustoconical sealing surface 84 provides improved engagement with the circumferential convex seating surface 22 of the disc member 20 when the disc member is closed.

The sealing element 74A in FIGS. 8, 9 and 10 may be more precisely defined as including a rear surface 86 which engages the seat ring 50C; a spaced parallel forward surface 88 which engages the body lip portion 72; an outer circumferential surface 90 which engages the body fluid passageway 14; a frustoconical annular sealing surface 84 which engages the seating surface 22 of the disc member when the disc member is in closed position; and an internal cylindrical surface 92 which engages the annular seat ring lip portion 70. The second important difference in the arrangement of the seal of FIGS. 8, 9 and 10 is the provision of a plurality of small diameter pressure release openings 94 communicating the frustoconical annular sealing surface 84 with the rear surface 86. The function of the pressure release openings 94 is to relieve the pressure which may accumulate behind the sealing element 74A and thereby prevent the sealing element from being inadvertently dislodged from its position in the valve body.

The invention herein which has now been described provides a highly improved butterfly valve. The basic improvements include the provision of means of positively engaging the disc member with the seat element; of an adjustable seat element providing compensation for manufacturing tolerances or wear in the body; an arrangement wherein the disc is forced into positive engagement with the seat element without applying lateral force to the stem members; improved seat arrangements providing more effective sealing engagement with the disc member sealing surface; and means of relieving pressure behind resilient seating elements to prevent the sealing elements from being inadvertently dislodged.

It is understood that the invention is not to be limited by the abstract herein, nor the summary, no the embodiments which have been illustrated and described for purposes of exemplifying the invention, but the invention is to be limited only by the scope of the attached claim or claims, including the full range of equivalency to which each element thereof is entitled.

I claim:

1. A butterfly valve having improved positive closure means comprising:

a body having an axial flow passageway therethrough and smaller diameter coaxial upper and lower stem openings therein normal to and intersecting said flow passageway, said flow passageway including a seat portion;

a disc member positioned in said flow passageway defined by a substantially flat circular portion have a circumferential seating surface thereon, and disc member being rotatable between a closed position in which said seating surface engages said body seat portion and an opened position permitting fluid flow through said seat portion, and including an integral upper stem boss portion and an integral lower stem boss portion each extending perpendicularly from said circular portion in the direction opposite said seating surface, said stem boss portions being paralleled to and spaced from each other, said stem boss portions each having an aligned stem receiving opening therein;

an upper stem member rotatably and sealably received in said body upper stem opening and also received in said stem receiving opening of said disc member upper boss portion, said upper stem member extending externally of said body;

a lower stem member rotatably and sealably received in said body lower stem opening and also received in said stem receiving opening of said disc member lower boss portion, said disc member upper and lower stem boss portions each having a pin receiving opening thereon and perpendicular said disc member flat portion and each of said stem members having a pin receiving opening thereon;

a first pin received in said upper stem member pin receiving opening and said disc member upper boss portion pin receiving opening, and a second pin received in said lower stem member pin receiving opening and said disc member lower boss portion pin receiving opening, said stem receiving openings in said disc member boss portions being of a configuration permitting limited lateral displacement of said disc member relative to said stem members in the plane perpendicular said disc member flat portion; and cam means integral with said disc member opposite said seating surface, said cam means engaging with a portion of said valve body as said disc member is rotated to the closed position to urge said disc member into sealing engagement with said seat portion.

2. A valve according to claim 1 wherein said body seat portion is defined by an enlarged internal diameter portion of said fluid passageway having internal threads, and a removable annular seat ring member having external threads on the circumference thereof, said ring member being threadably receivable in said threaded portion of said body, and said seat ring being further defined by an annular seating surface sealably engageable by said seating surface of said disc member when said disc member is in closed position.

3. A valve according to claim 2 wherein said seating surface of said seat ring is a concave cross section configuration and wherein said seating surface of said disc member is of convex cross section configuration.

4. A valve according to claim 2 including at least one small diameter internally threaded opening in said seat ring, the axis of said small diameter opening being a radius of the ring axis and in a plane of said external threads, and including a set screw threadably received in said threaded opening engageable with said body to prevent inadvertent rotation of said seat ring relative to said body.

5. A valve according to claim 1 wherein said disc member has an annular groove in said seating surface thereof and including an annular resilient gasket member received in said annular groove, a portion of said gasket member normally extending exposed past said disc member annular seating surface when said disc member is in the opened position and sealably engaging said body seating surface when said disc member is in closed position.

6. A valve according to claim 5 wherein said gasket member has a plurality of spaced-apart small diameter pressure relieving apertures therein.

7. A valve according to claim 1 wherein said body seat portion is defined by an enlarged internal diameter portion of said fluid passageway having internal threads, and a removable annular seat ring member having external threads on the circumference thereof, said ring member being threadably receivable in said threaded portion of said body and said seat ring being further defined in cross section by a reduced external diameter lip portion, said lip portion extending in the direction towards said disc member; and a resilient annular seal member of internal diameter equal the external diameter of said lip portion, said resilient annular seat member being positioned between said seat member lip portion and said body annular passageway, said annular seal member sealably engaging said seating surface of said disc member when said disc member is in closed position.

8. A valve according to claim 7 wherein said seat ring includes a plurality of spaced-apart small diameter pressure energizing openings the axis of each being parallel said fluid passageway axial opening, each of said pressure energizing openings communicating with said resilient seal member at a point intermediate said seal ring lip portion and said body flow passageway.

9. A valve according to claim 7 wherein said resilient annular seal member is defined in part by a substantially frustoconical annular sealing surface member seating surface when said disc member is in closed position.

10. A valve according to claim 9 wherein said resilient annular seal member is defined in cross section by a rear surface engaging said seat ring and a spaced paralleled forward surface, the forward and rearward surface being perpendicular the interior and exterior circumferential surfaces and wherein said resilient annular seal member includes a plurality of spaced-apart small diameter pressure release openings therein, each of said openings communicating said annular sealing surface with said rear surfaces.

11. A valve according to claim 7 wherein said body fluid passageway is defined in part by an annular reduced internal diameter body lip portion spaced from said threaded portion, wherein said annular resilient seal member is restrained between said seat member lip portion and said body lip portion.

12. A valve according to claim 11 wherein said body lip portion includes a plurality of spaced-apart small diameter pressure release openings therein.